United States Patent
Easter et al.

(10) Patent No.: US 9,824,245 B2
(45) Date of Patent: Nov. 21, 2017

(54) METHODS, SYSTEMS AND DEVICES FOR ELECTRONIC ARTICLE SURVEILLANCE DEACTIVATION HAVING RANDOMIZED TRANSMISSION RATES

(71) Applicant: Ronald B. Easter, Parkland, FL (US)

(72) Inventors: Ronald B. Easter, Parkland, FL (US); Gerardo Aguirre, Boca Raton, FL (US)

(73) Assignee: Tyco Fire & Security GmbH, Neuhausen AM Rheinfall (CH)

(*) Notice: Subject to any disclaimer, the term of this patent is extended or adjusted under 35 U.S.C. 154(b) by 100 days.

(21) Appl. No.: 14/212,001

(22) Filed: Mar. 14, 2014

(65) Prior Publication Data

US 2014/0266629 A1     Sep. 18, 2014

Related U.S. Application Data

(60) Provisional application No. 61/785,168, filed on Mar. 14, 2013.

(51) Int. Cl.

| G06K 7/00 | (2006.01) |
|---|---|
| G06K 19/07 | (2006.01) |
| G08B 13/24 | (2006.01) |
| G06K 7/10 | (2006.01) |

(52) U.S. Cl.
CPC ...... *G06K 7/10009* (2013.01); *G08B 13/2411* (2013.01); *G06K 7/10029* (2013.01); *G08B 13/2482* (2013.01)

(58) Field of Classification Search
CPC .......... G06K 7/0008; G06K 7/10009; G06K 7/10029; G06K 19/0723; G08B 13/2402; G08B 13/2411; G08B 13/2482

USPC .............................................. 340/10.3, 572.3
See application file for complete search history.

(56) References Cited

U.S. PATENT DOCUMENTS

| 5,537,105 A | * | 7/1996 | Marsh | G01S 13/758 340/10.1 |
|---|---|---|---|---|
| 6,249,229 B1 | | 6/2001 | Eckstein et al. | |
| 6,480,143 B1 | * | 11/2002 | Kruger | G06K 7/10059 342/42 |
| 6,750,768 B2 | | 6/2004 | Yang et al. | |

(Continued)

*Primary Examiner* — Quan-Zhen Wang
*Assistant Examiner* — Stephen Burgdorf
(74) *Attorney, Agent, or Firm* — Fox Rothschild LLP; Robert J. Sacco; Carol E. Thorstad-Forsyth (57) ABSTRACT

Methods, systems and devices for providing an interrogation signal from a handheld deactivation device for identifying a security tag. Identifying the security tag includes initiating an interrogation signal, wherein the interrogation signal includes plurality of transmission bursts and a plurality of random time periods to wait between transmission bursts such that a unique time period elapses between each of the plurality of transmission bursts. The interrogation signal is then transmitted by transmitting each of the plurality of transmission bursts for a portion of a duty cycle and interrupting transmission between each of the plurality of transmission bursts for one of the plurality of random time periods such that a unique and random time period elapses between each of the plurality of transmission bursts. The period transmission of the interrogation signal provides for improved battery life of a handheld scanning and deactivation device.

20 Claims, 7 Drawing Sheets

(56) References Cited

U.S. PATENT DOCUMENTS

| | | | | |
|---|---|---|---|---|
| 7,362,212 | B2* | 4/2008 | Burghard | G06K 7/0008 340/10.1 |
| 8,804,483 | B2* | 8/2014 | Shi | H04L 25/493 370/205 |
| 2002/0196144 | A1* | 12/2002 | Belka | G08B 13/2411 340/572.1 |
| 2003/0231113 | A1* | 12/2003 | Yang | G08B 13/2471 340/572.1 |
| 2004/0145477 | A1* | 7/2004 | Easter | G08B 13/242 340/572.3 |
| 2007/0046436 | A1* | 3/2007 | Tanaka | G06K 7/0008 340/10.2 |
| 2008/0024269 | A1* | 1/2008 | Watanabe | G06K 19/0672 340/5.8 |

* cited by examiner

METHODS, SYSTEMS AND DEVICES FOR ELECTRONIC ARTICLE SURVEILLANCE DEACTIVATION HAVING RANDOMIZED TRANSMISSION RATES

CROSS REFERENCE TO RELATED APPLICATIONS

This application claims the benefit of U.S. Provisional Patent Application Ser. No. 61/785,168, filed Mar. 14, 2013, which is herein incorporated by reference.

FIELD OF THE INVENTION

This document relates generally to Electronic Article Surveillance ("EAS") systems. More particularly, this document relates to handheld deactivators of EAS systems in which a transmission rate for an interrogation signal includes randomly timed transmission bursts.

BACKGROUND OF THE INVENTION

EAS systems are well known for the prevention or deterrence of unauthorized removal of articles from a controlled area. In a typical EAS system, security tags are attached to articles to be protected. The security tags are designed to interact with an electromagnetic field located at the exits of the controlled area. If a security tag is brought into the electromagnetic field or "interrogation zone", the presence of the security tag is detected and appropriate action is taken. For a controlled area such as a retail store, the appropriate action taken for detection of a security tag may be the generation of an alarm. Some types of security tags remain attached to the articles to be protected, but are deactivated prior to authorized removal from the controlled area by a deactivation device that changes the characteristics of the security tag so that the security tag will no longer be detectable in the interrogation zone.

In some scenarios, the deactivation device includes a handheld deactivation device for use by store employees. The handheld deactivation device may be part of a handheld bar-code scanner or other battery powered device. In this case, power needs to be used very efficiently in order for the battery's charge to last for several hours. Conventionally, a relatively large amount of battery power has been wasted since the transmit current (or power) of the deactivator is fixed to a selected level.

SUMMARY

The present invention concerns implementing methods, systems and devices for providing an interrogation signal from a handheld deactivation device for identifying a security tag. In one example scenario, a method includes initiating an interrogation signal, wherein the interrogation signal includes plurality of transmission bursts and a plurality of random time periods to wait between transmission bursts such that a unique time period elapses between each of the plurality of transmission bursts. The interrogation signal is then transmitted.

According to another example scenario, the method can include transmission of the interrogation signal includes transmitting each of the plurality of transmission bursts for a portion of a duty cycle and interrupting transmission between each of the plurality of transmission bursts for one of the plurality of random time periods such that a unique and random time period elapses between each of the plurality of transmission bursts.

The method can further include receiving a return signal in response to the interrogation signal, determining whether the return signal indicates a security tag to be deactivated and transmitting a deactivation signal. Similarly, the method can further include determining the plurality of random time periods. In one example scenario, determining the plurality of random time periods is done with a random number generator.

In another example scenario, a system for providing an interrogation signal from a handheld deactivation device for identifying a security tag includes a processing device and a non-transitory computer readable medium operably connected to the processing device. The non-transitory computer readable medium is configured to store one or more instructions that, when executed, cause the processing device to initiate an interrogation signal, wherein the interrogation signal comprises a plurality of transmission bursts and a plurality of random time periods to wait between transmission bursts such that a unique time period elapses between each of the plurality of transmission bursts. The one or more instructions, when executed, can further cause the processing device to provide an instruction to a transmit module operably connected to the processing device to transmit the interrogation signal.

According to another example scenario, the system can include one or more instructions for causing the processing device to provide an instruction to the transmit module to transmit each of the plurality of transmission bursts for a portion of a duty cycle and provide an instruction to the transmit module to interrupt transmission between each of the plurality of transmission bursts for one of the plurality of random time periods such that a unique and random time period elapses between each of the plurality of transmission bursts.

The system can further include one or more instructions for causing the processing device to receive a return signal in response to the interrogation signal, determine whether the return signal indicates a security tag to be deactivated and provide an instruction to a deactivation module operably connected to the transmit module to transmit a deactivation signal.

Additionally, the system can include one or more instructions for causing the processing device to determine the plurality of random time periods. In one example scenario, determining the plurality of random time periods is done with a random number generator.

In another example scenario, a handheld device for providing an interrogation signal for identifying a security tag includes at least a microprocessor and a transmit module operably connected to the microprocessor. The microprocessor can be configured to initiate an interrogation signal, wherein the interrogation signal comprises a plurality of transmission bursts and a plurality of random time periods to wait between transmission bursts such that a unique time period elapses between each of the plurality of transmission bursts, as well as provide an instruction to a transmit module operably connected to the processing device to transmit the interrogation signal. The transmit module can be configured to receive the indication to transmit the interrogation signal, transmit each of the plurality of transmission bursts for a portion of a duty cycle, and interrupt transmission between each of the plurality of transmission bursts for one of the plurality of random time periods such that a unique and random time period elapses between each of the plurality of transmission bursts.

In another example scenario, the processing device is further configured to receive a return signal in response to the interrogation signal, determine whether the return signal indicates a security tag to be deactivated, and provide an instruction to a deactivation module operably connected to the transmit module to transmit a deactivation signal.

Additionally, in a further example of the handheld device, the processing device is further configured to determine the plurality of random time periods by using a random number generator operably connected to the processing device.

In each of the method, system and device, the security tag can be an Electronic Article Surveillance ("EAS") security tag, and each of the plurality of transmission bursts can be approximately 58 kHz bursts.

DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments of the present invention will now be described with respect to FIGS. 1-7. The present invention generally relates to novel systems and methods for improving battery life and overall performance of handheld scanning and deactivation devices for EAS security systems. More specifically, the present disclosure relates to randomly modulating higher powered interrogation signal bursts as transmitted from a handheld scanning and deactivation device for use in identifying EAS security tags. However, it should be noted that, although EAS security systems and security tags are discussed herein, they are provided by way of example only, and the techniques and processes as described herein can be applied to any wireless security tag scanning and deactivation device.

Additionally, the present invention can be used with any handheld device that is configured to transmit interrogation and deactivation signals. Still, the present invention will be described below in relation to handheld scanning and deactivation devices simply for ease of explanation. The present invention is in no way limited to handheld scanning and deactivation device applications. The present invention can be employed in any application in which a device is to transmit interrogation and deactivation signals to an external device such as a security tag.

Figure 1:
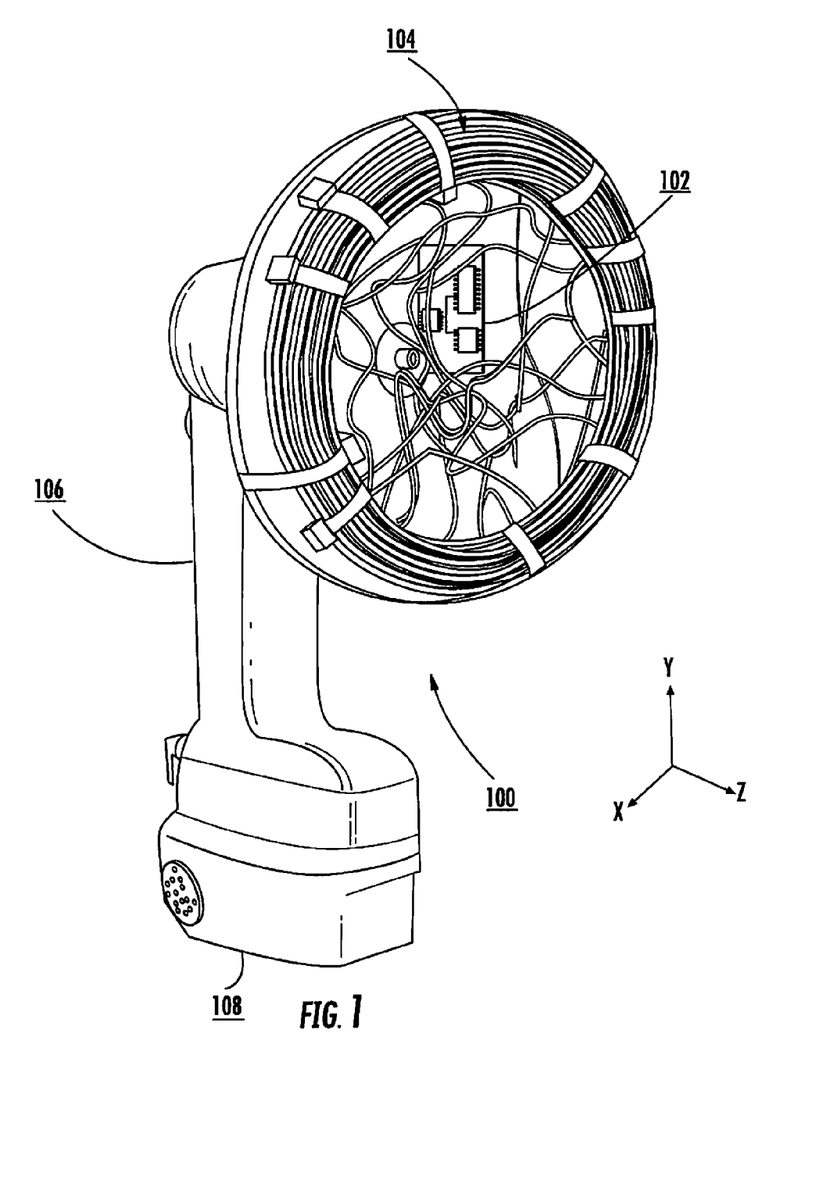
FIG. 1 is a schematic illustration of an exemplary architecture for a handheld scanning and deactivation device that is useful for understanding the present invention.

Referring now to FIG. 1, there is provided a schematic illustration of an exemplary handheld scanning and deactivation device 100 that is useful for understanding the present invention. Handheld scanning and deactivation device 100 is configured for use in an EAS system as a cordless device for deactivating EAS security tags. The handheld scanning and deactivation device 100 is described below in relation to scenarios employing magnetomechanical EAS systems, which require generation of a magnetic field for deactivation of EAS security tags. The present invention is not limited in this regard. The present invention can be adapted for use with a plurality of different EAS systems and EAS security tags.

Notably, the handheld scanning and deactivation device 100 implements its electrical characteristics in a hardware package that has a relatively low overall weight for minimizing operator fatigue and a relatively low overall energy requirement for making battery operation feasible. A deactivation range of at least about three inches, a weight less than about two pounds, and a battery life of at least about twelve hours with a deactivation rate of two hundred per hour is desired.

As shown in FIG. 1, the handheld scanning and deactivation device 100 can include an air-core coil 104, an electronic circuit 102, a housing 106, and a battery 108. The air-core coil 104 has a coil size and number of amp-turns that are selected to achieve the required field level for deactivation of magnetomechanical EAS security tags out to at least about three inches from handheld scanning and deactivation device 100, while minimizing weight and battery energy. Battery 108 can be contained fully within housing 106, or plugged into a mating connector and attached to the housing 106 in a flush manner.

Exemplary architectures for the electronic circuit 102 will be described below in relation to FIGS. 2-5. Still, it should be understood that the electronic circuit 102 is configured to reduce overall power consumption by the handheld scanning and deactivation device 100. In this regard, the electronic circuit 102 provides a randomly timed interrogation signal so as to reduce the overall power required for scanning and deactivating a security tag such as an EAS security tag. In effect, the present invention overcomes various drawbacks of conventional handheld scanning and deactivation devices, such as those described in the background section of this document. For example, the present disclosure provides a handheld scanning and deactivation device with an improved power consumption feature as compared to that of conventional handheld scanning and deactivation devices in which a transmit level is fixed and therefore remains "high" during an entire interrogation period. Thus, the present disclosure provides an improved handheld scanning and deactivation device having improved battery life and reliability as compared to conventional handheld scanning and deactivation devices.

Figure 2:
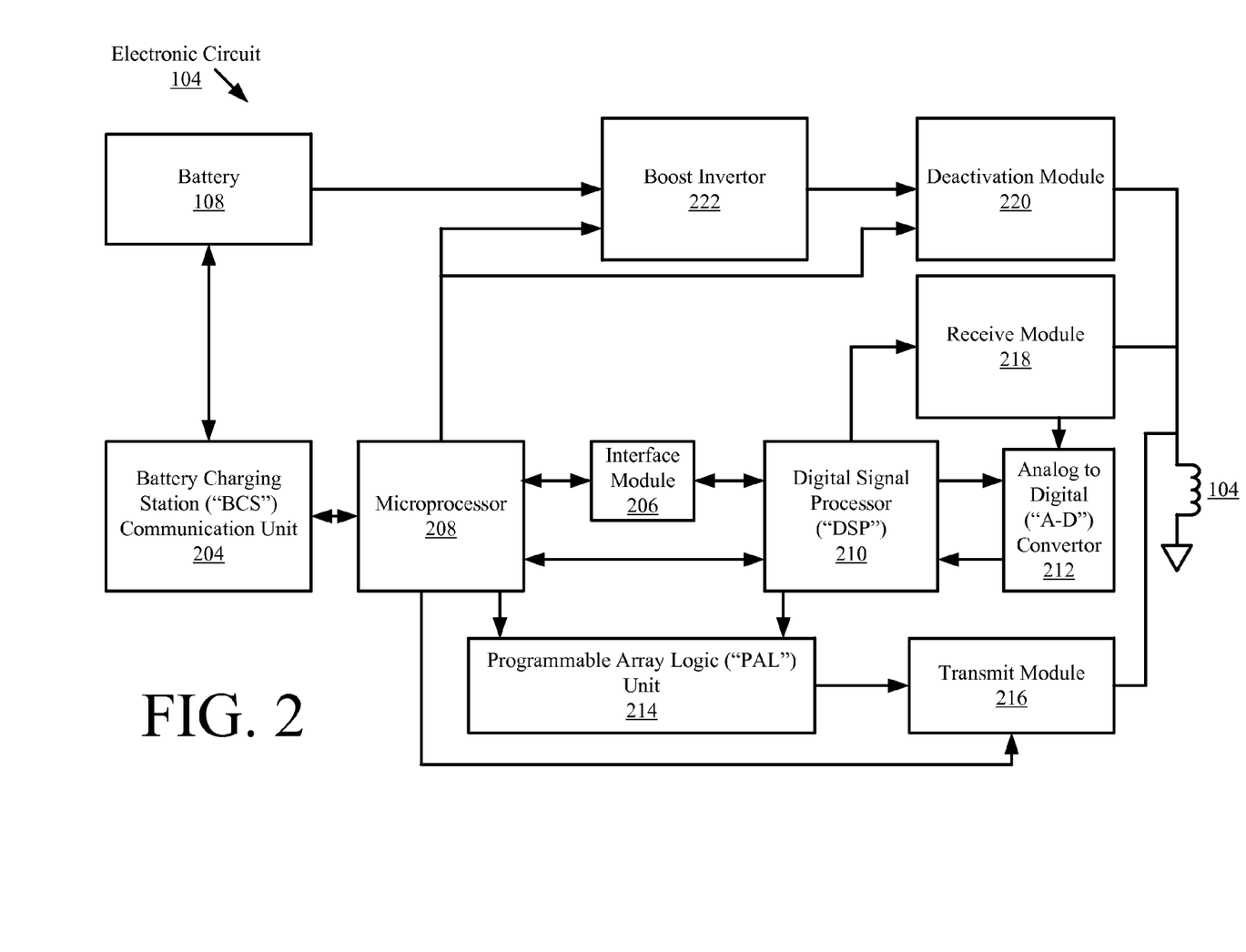
FIG. 2 is a block diagram of an exemplary architecture for an electronic circuit of the handheld scanning and deactivation device shown in FIG. 1.

Referring now to FIG. 2, there is provided a block diagram of an exemplary architecture for the electronic circuit 102 of the handheld scanning and deactivation device 100 shown in FIG. 1. Notably, the handheld scanning and deactivation device 100 is configured to operate in several operational modes. The operational modes include, but are not limited to, a manual operational mode, an automatic operational mode, a hands free operational mode, a detection only mode, and/or a deactivation only mode. The operational mode of the handheld scanning and deactivation device 100 can be modified by a user thereof via an interface module 206 of the electronic circuit 102. The interface module 206 includes, but is not limited to, a display screen, switches and/or a keypad to facilitate user-software interactions.

During one or more of these operational modes, the electronic circuit 102 transmits an interrogation signal in the direction of an EAS security tag. For example, an interrogation signal can include a 1.6 ms burst of the desired interrogation frequency (e.g., 58 KHz) is transmitted by a transmit module 216 and the air-core coil 104 at a repetition rate of about 40 Hz. Timing of the bursts is controlled by a Programmable Array Logic ("PAL") unit 214. PAL unit 214 can include, but is not limited to, a PAL having part number PALLV16V8z which is available from Lattice Semiconductor of Portland, Oreg. Typically, depending on the operational mode, the bursts will continue for a default time period (e.g., about three to four minutes) or a selected time period. However, as disclosed herein, to reduce overall power consumed the interrogation signal can be transmitted as a series of transmission bursts over the default time period, having a randomized timing pattern so as to not interfere with other wireless devices.

Upon receipt of the interrogation signal, the EAS security tag resonates so as to transmit a return signal. In turn, a receive module 218 of the electronic circuit 102 receives the return signal and forwards the return signal to a Digital Signal Processor ("DSP") 210 via an Analog-to Digital ("A-D") convertor 212.

The DSP 210 of the electronic circuit 102 processes the return signal for determining if it is a valid EAS security tag signal. In this regard, the DSP 210 analyzes the return signal to detect selected attributes thereof. For example, the return signal must have proper spectral content and must be received in successive windows as expected. If DSP 210 determines that the return signal is a valid EAS security tag signal, then the DSP 210 signals a microprocessor 208 to initiate deactivation of the EAS security tag and/or to indicate detection of the EAS security tag, depending on the particular operational mode. The indication of an EAS security tag detection can take the form of an audio, visual and/or tactile alert to the user of the handheld scanning and deactivation device 100. In some scenarios, the microprocessor 208 includes, but is not limited to, a microprocessor having part number 68HC908GP32 which is available from Motorola, Inc.

Additionally, the microprocessor 208 can include a non-transitory computer readable medium, or be connected to a non-transitory computer readable medium, that includes one or more instructions for instructing the microprocessor to signal the transmit module 216 to generate a series of interrogation signal pulses. The microprocessor can further instruct the transmit module 216 to wait a period of time between the deactivation pulses.

For example, the microprocessor 208 can instruct the transmit module 216 to transmit a series of interrogation signal pulses over a specific time period (e.g., over 1.6 seconds). The microprocessor 208 can further instruct the transmit module 216 to wait a first number of duty cycles between pulse one and pulse two, a second number of duty cycles between pulse two and pulse three, a third number of duty cycles between pulse three and pulse four, a fourth number of duty cycles between pulse four and pulse five, and so on until the completion of the specific time period. The microprocessor 208 can determine the values for the number of duty cycles to wait by using, for example, a random number generator seeded and configured to produce a whole integer between two set values, e.g., between one and ten.

Alternatively, the microprocessor 208 can instruct the transmit module 216 to wait a random and specific time period between each pulse such that a unique time period passes between each transmission pulse. For example, the microprocessor 208 can instruct the transmit module 216 to wait 552 ms between pulse one and pulse two, 376 ms between pulse two and pulse three, 296 ms between pulse three and pulse four, 412 ms between pulse four and pulse five, and so on until the completion of the specific time period. The microprocessor 208 can determine the specific time period to wait by using, for example, a random number generator seeding and configured to produce a whole integer between two set values, e.g., between 200 and 600.

In effect, the transmit current (or power) level does not remain high during the entire interrogation signal period. Rather the interrogation signal is transmitted in a series of predetermined or randomly timed bursts, thereby improving the overall power consumption by the handheld scanning and deactivation device 100.

For deactivation of the EAS security tag, the microprocessor 208 signals a deactivation module 220 to generate a deactivation pulse for deactivating the EAS security tag. In some scenarios, the deactivation module 220 uses a boost inverter 222 to convert a DC battery voltage of battery 108 into a high current alternating pulse having a decaying envelope. The high current alternating pulse causes the deactivation of the EAS security tag.

In some scenarios, the battery 108 is a rechargeable battery. As such, a Battery Charging Station ("BCS") communication unit 204 is provided to facilitate the recharging of the battery. The BCS communication unit 204 can send battery charge information and battery recharge status information to the microprocessor 208. This information may be output to the user of the handheld scanning and deactivation device 100 via the interface module 206.

Figure 3:
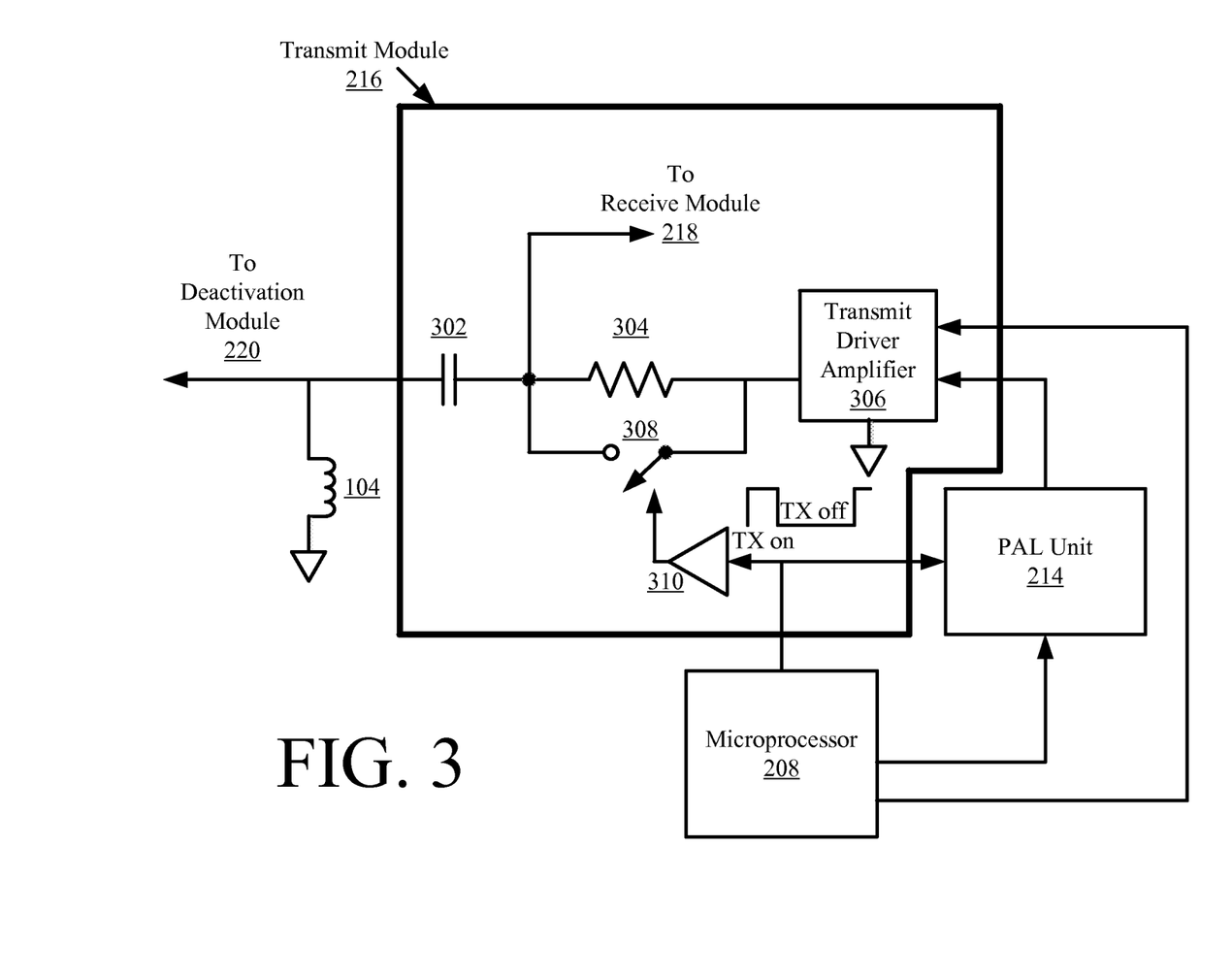
FIG. 3 is a schematic illustration of an exemplary architecture for a transmit module of the handheld scanning and deactivation device shown in FIG. 1.

Referring now to FIG. 3, there is provided a schematic illustration of an exemplary architecture for the transmit module 216 of the handheld scanning and deactivation device 100. Transmit module 216 comprises a transmit driver amplifier 306, passive components 302, 304, and a switch 308. The switch 308 is coupled to the microprocessor 208. The microprocessor 208 controls the opening and closing of the switch 308 so as to turn on and turn off the transmit module 216. In this regard, the microprocessor 208 may communicate a pulse signal to the switch 308 via a delay 310. The pulse signal causes the switch to transition between an open position and a closed position.

The microprocessor 208 also controls the PAL unit 214 so as to generate an interrogation signal at the proper transmit frequency and burst rate. The interrogation signal is then communicated from the PAL unit 214 to the transmit driver amplifier 306. The transmit driver amplifier 306 sets a value of the transmit current (or power) for the interrogation signal in accordance with information received from the microprocessor 208. The information can be specified via a voltage level of a control signal generated by the microprocessor 208. The voltage level of the control signal is dynamically adjusted based on detected levels of environmental noise. The interrogation signal is then sent from the transmit driver amplifier 306 through a resistor 304 and a capacitor 302 to the air-core coil 104. Next, the interrogation signal is transmitted by the air-core coil 104 at the specified power level.

As noted above, the transmit module 216 can receive an instruction from the microprocessor 208 to produce a series of interrogation signals, the series of signals having a random length of time between signal bursts. To control the timing of the signal bursts, the microprocessor 208 can determine an appropriate timing pattern for closing and opening switch 308, thereby resulting in a series of randomly timed interrogation signal bursts. Alternatively, the microprocessor 208 can send an instruction to PAL unit 214 to produce the randomly timed series of interrogation signal bursts.

Figure 4:
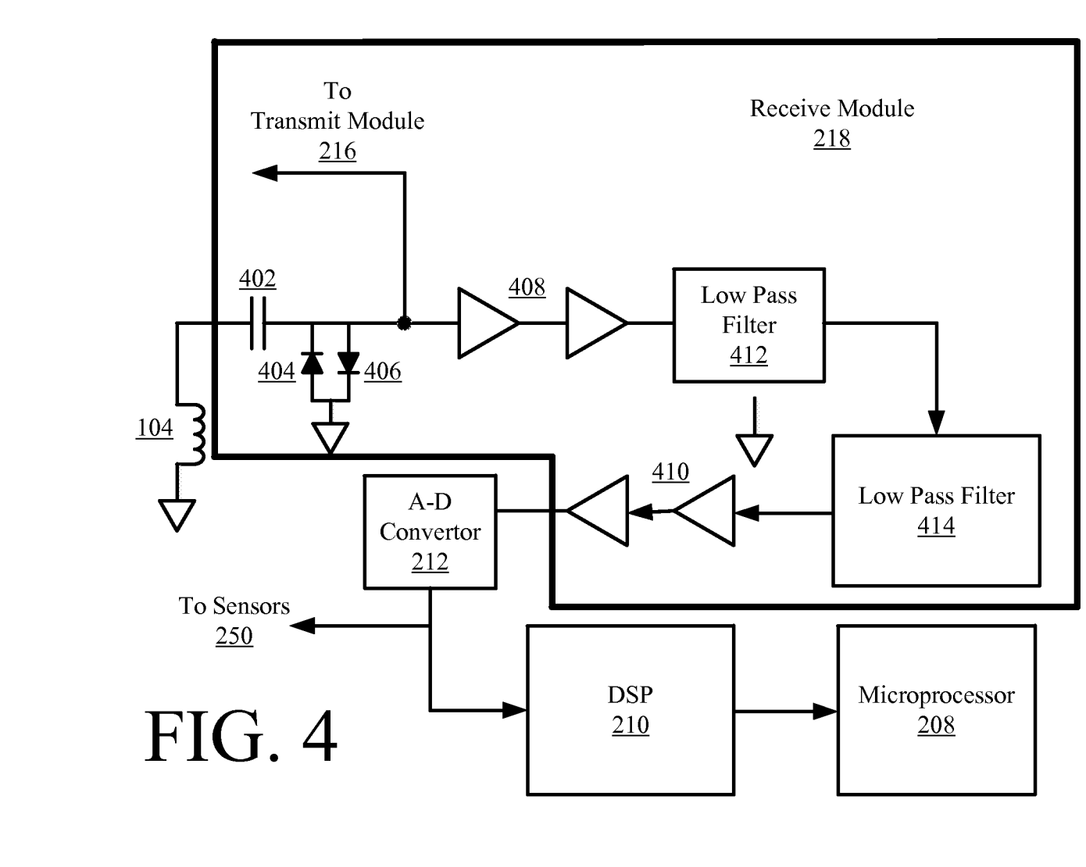
FIG. 4 is a schematic illustration of an exemplary architecture for a receive module of the handheld scanning and deactivation device shown in FIG. 1.

Referring now to FIG. 4, there is provided a schematic illustration of an exemplary architecture for the receive module 218 of the handheld scanning and deactivation device 100. As noted above, the receive module 218 is configured to receive a return signal from an EAS security tag. The return signal from air-core coil 104 passes through a capacitor 402, amplifier stages 408, 410 and low pass filter stages 412, 414. The return signal is then converted from an analog signal to a digital signal by A-D convertor 212. Thereafter, the digital return signal is sent to the DSP 210 for verification processing, as described above. After verification that the digital return signal has valid return signal attributes, the DSP 210 signals the microprocessor 208 that an active EAS security tag has been detected.

Figure 5:
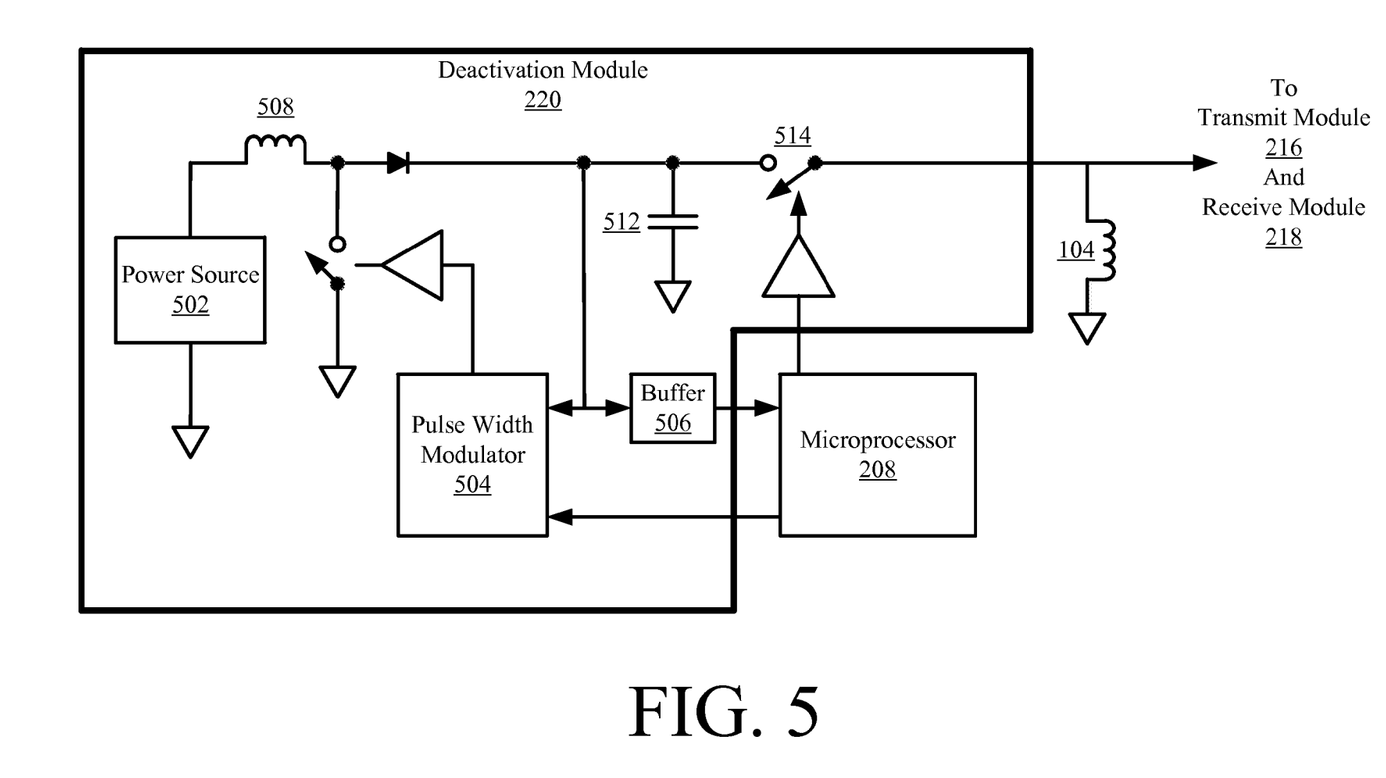
FIG. 5 is a schematic illustration of an exemplary architecture for a deactivation module of the handheld scanning and deactivation device shown in FIG. 1.

Referring now to FIG. 5, there is provided a schematic illustration of an exemplary architecture for the deactivation module 220 of the handheld scanning and deactivation device 100. The deactivation module 220 comprises a Pulse Width Modulator ("PWM") 504. The PWM 504, in conjunction with a capacitor 512 and an inductor 508, form boost invertor 222. As noted above, boost invertor 222 converts a nominal DC battery voltage from a relatively low voltage level (e.g., 8 Volts) to a relatively high level (e.g., 125 Volts). When a switch 514 is closed on command from microprocessor 208, the fully charge capacitor 512 is connected to the air-core coil 104. This initiates a natural resonant discharge producing a decaying alternating sinusoidal current waveform in the air-core coil 104.

In some scenarios, the deactivation frequency is approximately 800 Hz with a 25% decay rate. The inductance value, capacitance value and initial voltage of the capacitor determine the strength of the current waveform. These parameters are sized to produce the magnetic field level of sufficient strength to deactivate an EAS security tag out to a desired range of about three inches. Embodiments of the present invention are not limited to the particulars of these scenarios.

Figure 6:
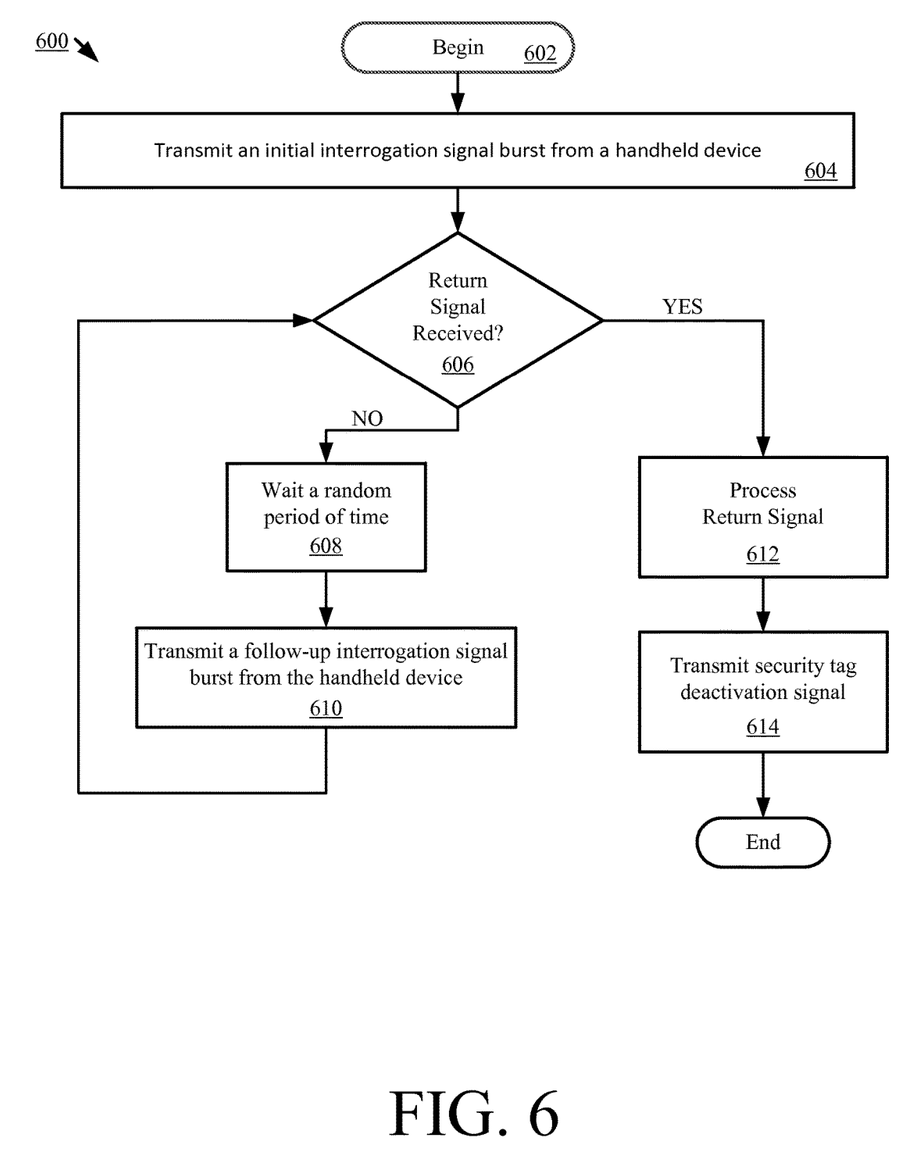
FIG. 6 is a flow diagram of an exemplary method for dynamically adjusting the transmission rate of an electronic article surveillance deactivation device.

Referring now to FIG. 6, there is provided a flow diagram of an exemplary method 600 for dynamically adjusting a transmit power level that is useful for understanding the present invention. Method 600 begins with step 602 and initially an interrogation signal is transmitted from a handheld scanning and deactivation device (e.g., handheld scanning and deactivation device 100 of FIG. 1) in the direction of at least one security tag at step 604. At this time, the interrogation signal is transmitted at a first transmit power level. The interrogation signal is transmitted for a period of time (e.g., 2-3 minutes). During this time period, the interrogation signal is received by at least one EAS security tag. In response to this reception, the EAS security tag generates a return signal. The return signal is then communicated from the EAS security tag to and received by the handheld scanning and deactivation device.

A microprocessor (e.g., microprocessor 208 of FIG. 2) can determine if a return signal has been received at decision step 606. If the microprocessor determines that a return signal has not been received (606:NO), the microprocessor can instruct the transmit module (e.g., transmit module 216 of FIG. 2) to wait a random time period at step 608. After waiting the random period of time, the transmit module can transmit a follow-up interrogation signal burst in step 610. Following the follow-up signal burst, the microprocessor can again monitor whether a return signal has been received at determination step 606.

If the microprocessor determines that a return signal has been received (606:YES), the microprocessor can process the received signal at step 612. If the microprocessor determines that the return signal indicates that an EAS tag should be deactivated, the microprocessor can instruct a deactivation module (e.g., deactivation module 220 of FIG. 2) to transmit a security tag deactivation signal at step 614.

It should be noted that the interrogation and deactivation process as described above was described with regard to the handheld scanning and deactivation device performing the transmission and determination steps. However, this is by way of example only. As described above, the microprocessor and transmit module can operate in concert such that the transmit module operates in response to transmit commands directly received from the microprocessor during the interrogation processor, specifically for implementing the randomly timed transmission bursts.

Figure 7:
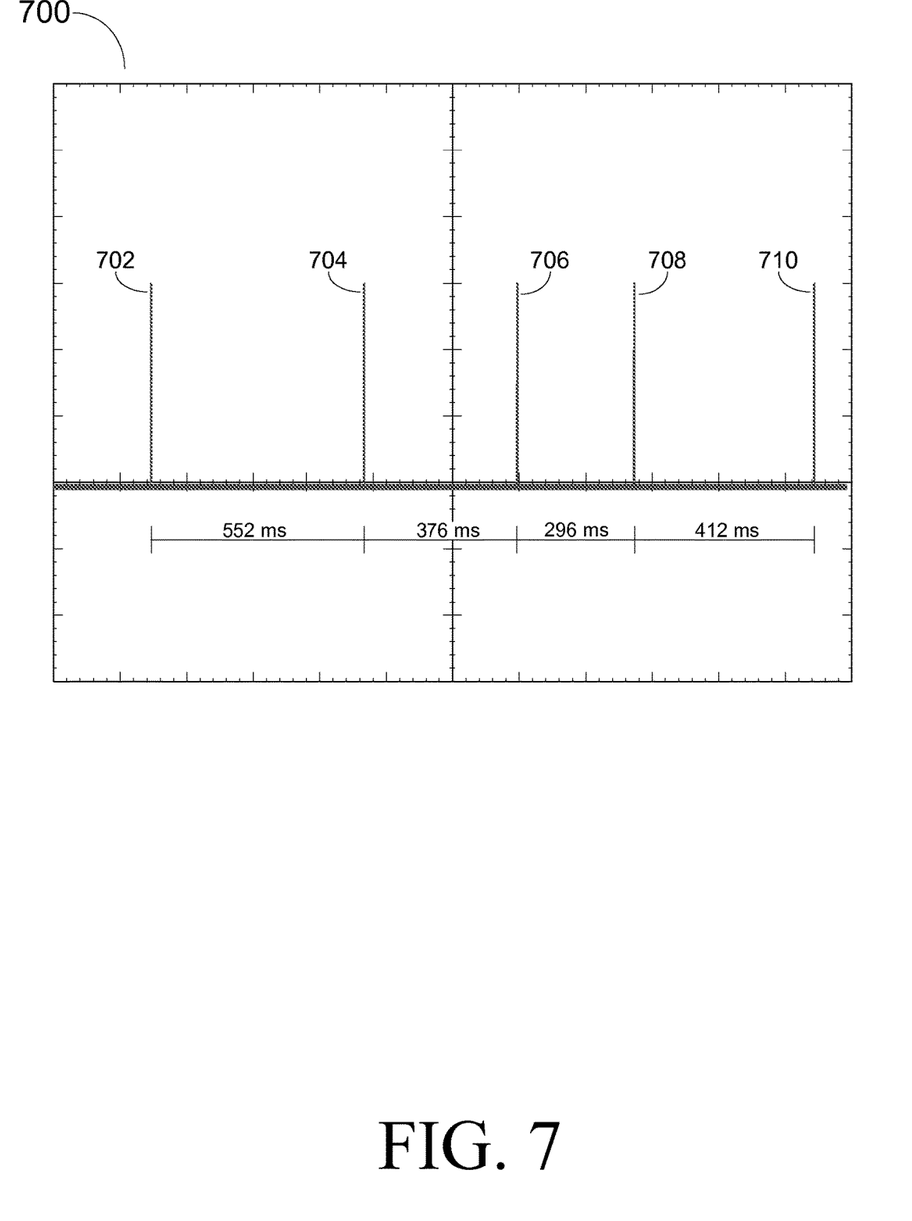
FIG. 7 illustrates a series of transmission bursts and the period between them according to an embodiment.

FIG. 7 shows a series 700 of transmission bursts, for example, 58 kHz interrogation transmission bursts, and the random timing period between them in accordance with one or more embodiment as described herein. It can be seen in FIG. 7 that the bursts are transmitted at a low-rate with random periods between the burst, similar to the process as described in the above discussion of FIG. 6. The low rate saves battery power and the randomness helps in eliminating any possible interference with other electronic devices such as cardiac assist devices.

More specifically, as shown in FIG. 7, a first transmission burst 702 of the interrogation signal can be transmitted for a short period of time, e.g., less than 10% of a duty cycle. The transmit module of the handheld scanning and deactivation device (e.g., transmit module 216 of handheld scanning and deactivation device 100) can wait a first period of time before transmitting the second transmission burst 704 of the interrogation signal. For example, as shown in FIG. 7, the transmit module can wait 552 ms between burst 702 and burst 704. Similarly, the transmit module can wait 376 ms between second transmission burst 704 and a third transmission burst 706 of the interrogation signal. The transmit module can also wait 296 ms between the third transmission burst 706 and a fourth transmission burst 708 of the interrogation signal, as well as 412 ms between the fourth transmission burst and a fifth transmission burst 710 of the interrogation signal.

Similarly, random time periods can be determined and included between additional transmission bursts of the interrogation signal. However, it should be noted that the timing pattern as shown in FIG. 7 is shown by way of example only, and other random time periods may be included between interrogation signal transmission bursts.

By providing a series of transmission bursts, the handheld scanning and deactivation device as described herein provides for a redundant interrogation process. Additionally, by randomizing or otherwise altering the period of time between transmission bursts, the handheld scanning and deactivation device as taught herein reduces potential interference with and from other wireless signal devices.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed:

1. A method for providing an interrogation signal from a handheld deactivation device for identifying an Electronic Article Surveillance ("EAS") security tag of a magnetomechanical type, the method comprising:
    initiating, by a processing device of the handheld deactivation device, an interrogation signal, wherein the interrogation signal comprises a plurality of identical transmission bursts and a plurality of randomly selected time periods to wait between the transmission bursts such that a time period of random duration elapses between each of the plurality of identical transmission bursts; and
    preventing the handheld deactivation device's interference with wireless signaling operations of another EAS system by transmitting the interrogation signal having the randomly selected time periods between the plurality of identical transmission bursts from a transmit module operably connected to the processing device; and
    facilitating a reduction in power consumption of the handheld deactivation device by randomly selecting the plurality of time periods from those having a duration of between 200 and 600 mS so as to reduce a total amount of time during which said handheld deactivation device is required to transmit relative to the wait between transmission bursts.

2. The method of claim 1, wherein transmitting the interrogation signal comprises:
    selecting each transmission burst to have a duration comprising less than 10 of a defined duty cycle; and
    controlling the randomly selected time period between transmission bursts after the first transmission pulse by waiting a randomly determined number of said duty cycles before each subsequent transmission burst.

3. The method of claim 1, further comprising:
    receiving, by the processing device, a return signal in response to the interrogation signal;
    determining, by the processing device, whether the return signal indicates a security tag to be deactivated; and
    transmitting, by a deactivation module operably connected to the transmit module, a deactivation signal.

4. The method of claim 1, further comprising determining, by the processing device, the plurality of randomly selected time periods.

5. The method of claim 4, wherein determining the plurality of randomly selected time periods comprises generating, by a random number generator operably connected to the processing device, the plurality of randomly selected time periods.

6. The method of claim 1, wherein each of the plurality of identical transmission bursts has a duration of 1.6 mS.

7. The method of claim 1, wherein said power consumption is further reduced by dynamically varying an amplitude of the interrogation signal based on a detected level of environmental noise.

8. A system for providing an interrogation signal from a handheld deactivation device for identifying an Electronic Article Surveillance ("EAS") security tag of a magnetomechanical type, the system comprising:
    a processing device; and a non-transitory computer readable medium operably connected to the processing device and configured to store one or more instructions that, when executed, cause the processing device to:
  initiate an interrogation signal, wherein the interrogation signal comprises a plurality of identical transmission bursts and a plurality of randomly selected time periods to wait between the transmission bursts such that a time period of random duration elapses between each of the plurality of identical transmission bursts, and
  preventing the handheld deactivation device's interference with wireless signaling operations of another system by providing an instruction to a transmit module operably connected to the processing device to transmit the interrogation signal having the randomly selected time periods between each of the plurality of identical transmission bursts; and
  facilitate a reduction in power consumption of the handheld deactivation device by randomly selecting the plurality of time periods from those having a duration of between 200 and 600 mS so as to reduce a total amount of time during which said handheld deactivation device is required to transmit relative to the wait between the transmission bursts.

9. The system of claim 8, wherein the one or more instructions for causing the processing device to provide the instruction to transmit the interrogation signal further comprises one or more instructions for causing the processing device to:
  select each transmission burst to have a duration comprising less than 10% of a defined duty cycle; and
  control the randomly selected time period between transmission bursts after the first transmission pulse by waiting a randomly determined number of said duty cycles before each subsequent transmission burst.

10. The system of claim 8, further comprising one or more instructions for causing the processing device to:
  receive a return signal in response to the interrogation signal;
  determine whether the return signal indicates a security tag to be deactivated; and
  provide an instruction to a deactivation module operably connected to the transmit module to transmit a deactivation signal.

11. The system of claim 8, further comprising one or more instructions for causing the processing device to determine the plurality of randomly selected time periods.

12. The system of claim 11, wherein the one or more instructions for causing the processing device to determine the plurality of random time periods comprises one or more instructions for causing the processing device to generate, using a random number generator operably connected to the processing device, the plurality of randomly selected time periods.

13. The system of claim 8, wherein each of the plurality of identical transmission bursts has a duration of 1.6 mS.

14. The system of claim 8, wherein said power consumption is further reduced by dynamically varying an amplitude of the interrogation signal based on a detected level of environmental noise.

15. A handheld device for providing an interrogation signal for identifying an Electronic Article Surveillance ("EAS") security tag of a magnetomechanical type, comprising:
  a microprocessor configured to:
    initiate an interrogation signal, wherein the interrogation signal comprises a plurality of identical transmission bursts and a plurality of randomly selected time periods to wait between the transmission bursts such that a time period of random duration elapses between each of the plurality of identical transmission bursts, and
    facilitate the prevention of the handheld device's interference with wireless signaling operations of a remote system by providing an instruction to a transmit module operably connected to the processing device to transmit the interrogation signal having the randomly selected time periods between the plurality of identical transmission bursts;
    facilitate a reduction in power consumption of the handheld deactivation device by randomly selecting the plurality of random time periods from those having a duration of between 200 and 600 mS so as to reduce a total amount of time during which said handheld deactivation device is required to transmit relative to the wait time; and
  said transmit module operably connected to the microprocessor and configured to:
    receive the indication to transmit the interrogation signal,
    transmit each of the plurality of identical transmission bursts, and
    interrupt transmission between each of the plurality of identical transmission bursts for one of the plurality of randomly selected time periods such that said time period of random duration elapses between each of the plurality of identical transmission bursts.

16. The device of claim 15, wherein the processing device is further configured to:
  receive a return signal in response to the interrogation signal;
  determine whether the return signal indicates a security tag to be deactivated; and
  provide an instruction to a deactivation module operably connected to the transmit module to transmit a deactivation signal.

17. The device of claim 15, wherein the processing device is further configured to determine the plurality of randomly selected time periods.

18. The device of claim 17, wherein the processing device is further configured to generate, using a random number generator operably connected to the processing device, the plurality of randomly selected time periods.

19. The device of claim 15, wherein each of the plurality of identical transmission bursts has a duration of 1.6 mS.

20. The device of claim 15, wherein said power consumption is further reduced by dynamically varying an amplitude of the interrogation signal based on a detected level of environmental noise.

* * * * *